(12) United States Patent
Van As et al.

(10) Patent No.: US 7,773,306 B2
(45) Date of Patent: Aug. 10, 2010

(54) ELECTROWETTING CELLS

(75) Inventors: Marco Andreas Jacobus Van As, Eindhoven (NL); Bernardus Hendrikus Wilhelmus Hendriks, Eindhoven (NL); Stein Kuiper, Eindhoven (NL); Johannus Wilhelmus Weekamp, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/555,686

(22) PCT Filed: May 7, 2004

(86) PCT No.: PCT/IB2004/050614

§ 371 (c)(1),
(2), (4) Date: Nov. 4, 2005

(87) PCT Pub. No.: WO2004/099847

PCT Pub. Date: Nov. 18, 2004

(65) Prior Publication Data

US 2006/0285220 A1    Dec. 21, 2006

(30) Foreign Application Priority Data

May 9, 2003   (EP) ................................. 03076428
Oct. 10, 2003  (EP) ................................. 03103759
Mar. 4, 2004   (EP) ................................. 04100868

(51) Int. Cl.
*G02B 3/12* (2006.01)
(52) U.S. Cl. ...................................................... 359/666
(58) Field of Classification Search ................ 359/619, 359/886, 228, 648–670; 396/580, 589, 228; 369/44.23

See application file for complete search history.

(56) References Cited

U.S. PATENT DOCUMENTS

| | | | |
|---|---|---|---|
| 5,541,776 A | | 7/1996 | Kobayashi et al. |
| 5,665,275 A | * | 9/1997 | Kobayashi et al. .......... 252/582 |
| 6,747,806 B2 | * | 6/2004 | Gelbart ........................ 359/666 |
| 2005/0253779 A1 | * | 11/2005 | Feenstra et al. ................ 345/6 |
| 2006/0028734 A1 | * | 2/2006 | Kuiper et al. ............... 359/676 |
| 2006/0158971 A1 | * | 7/2006 | Hendriks et al. ......... 369/44.23 |

FOREIGN PATENT DOCUMENTS

| | | | | |
|---|---|---|---|---|
| JP | 2002-169005 | * | 6/2002 | |
| JP | 2002162506 | | 6/2002 | |
| WO | WO 03/069380 A1 | * | 8/2003 | |
| WO | WO2004038480 A1 | * | 5/2004 | ................. 359/676 |

* cited by examiner

*Primary Examiner*—Scott J Sugarman
*Assistant Examiner*—Vipin M Patel (57) ABSTRACT

An electrowetting cell including an expandable joint between a body section and an end section. Such an expandable joint could include a membrane or a flange-like portion.

18 Claims, 9 Drawing Sheets

ELECTROWETTING CELLS

This invention relates to an electrowetting cell and a method of production thereof.

An electro-wetting lens is a variable lens based on the difference in optical characteristics between two immiscible liquids held in a cell. Application of a potential difference to the liquids, one of which is electrically conductive, the other of which is not, causes a meniscus between the liquids to change shape and thus alter the lens characteristics. The lenses are very compact and are suitable for mobile applications, such as cellphones, personal digital assistants and other mobile devices. As a result the devices must be able to withstand wide variations in environmental factors, such as temperature and benefit from some shock resistance. Increased temperature leads to increased pressure in the cells due to the expansion of the liquids in the cell, which can cause early failure thereof.

Electrowetting cells are more fully described in the applicant's co-pending patent application WO 03/069,380, part of the description of which is incorporated in the description below.

Figure 4:
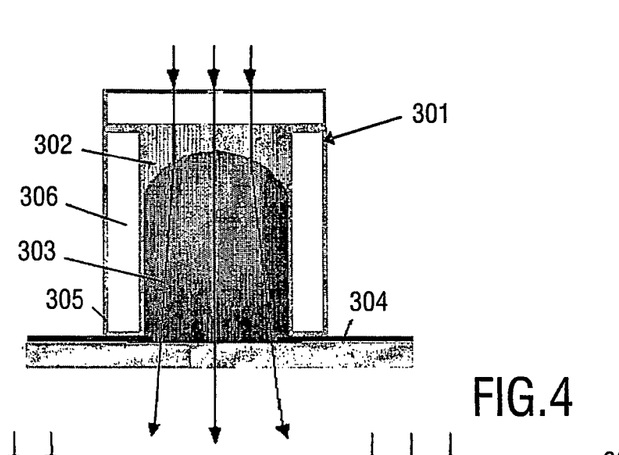
FIG. 4 is a schematic cross-sectional view of a prior art electrowetting cell in an inactivated state.
Figures 5, 6:
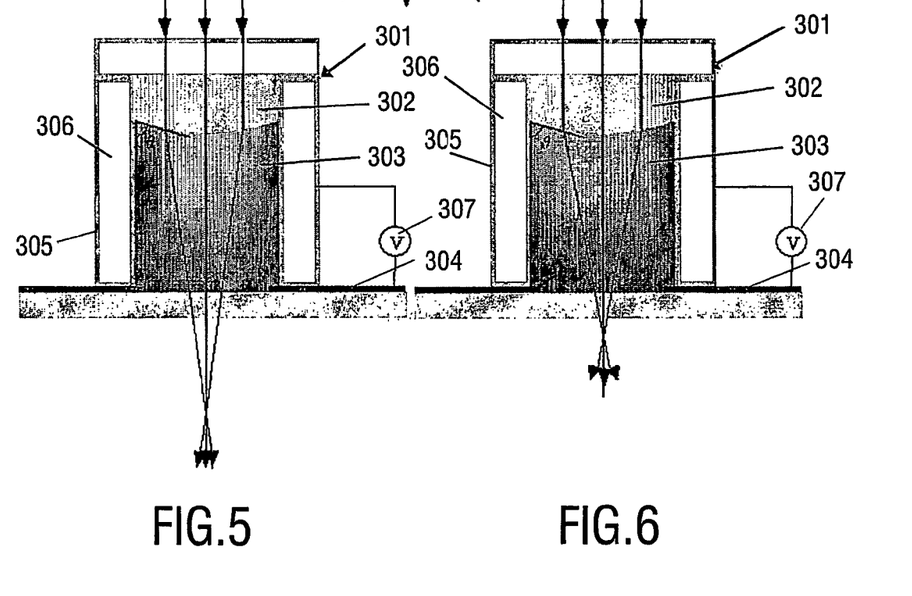
FIG. 5 is a schematic cross-sectional view of the electrowetting cell in an activated state.
FIG. 6 is a schematic cross-sectional view of the prior art electrowetting cell in an activated state showing the effect of a higher refractive index for the non-conducting liquids.

In electrowetting-based lenses the optical power of the lens depends on the curvature of the meniscus between conductive and non-conductive fluids and the difference in refractive indices between the conductive and non-conductive liquids, as can be seen in equation (1):

$$S = \frac{n_1 - n_2}{r} \qquad 1$$

where S is the optical power of the lens, r the radius of curvature of the meniscus, $n_1$ the refractive index of the non-conductive liquid and $n_2$ the refractive index of the conductive liquid From equation (1) it follows that by increasing the refractive index of the non-conductive liquid, the optical power of the electrowetting lens can be increased. This is shown in FIGS. 4 to 6, in which FIG. 4 shows incident light on an electrowetting lens 301 in an inactivated state, in which a meniscus between a non-conducting liquid 302 and a conducting liquid 303 curves downwards. The cell has a conducting layer 304, and insulating layer 305 and a conducting cylinder 306, as usual.

FIG. 5 shows the meniscus curved upwards, due to the presence of a voltage across the lens from a power supply 307. The light is converged beneath the lens 301.

FIG. 6 shows the same scenario as FIG. 5, except that the refractive index of the non-conducting liquid 302 is greater, thereby causing stronger refraction of the light rays and so convergence closer to the lens 301 than in FIG. 5.

An appropriate way has to be found of how to assemble electrowetting lenses such that they can withstand a broad range of temperatures (−40 to 85 degrees celcius), and so that they have a sufficiently long working lifetime. The lenses are currently made of coated glass tubes, and covered with coated glass windows. All parts are glued together.

By manufacturing the lenses in this way, there is no possibility for the liquids to expand, or contract. This causes the lenses to break at elevated temperatures, and at lower temperatures vapour in the lens becomes a problem.

It is an object of the invention to mitigate the abovementioned disadvantages.

It is a further object of the invention to provide an electrowetting cell with increased lifetime. It is still a further object of the invention to provide an electrowetting cell with a broader range of workable temperatures.

According to a first aspect of the invention, an electrowetting cell comprises a body section defining a cavity containing electrowetting fluids and at least one end section secured to an end of the body section, wherein said at least one end section is secured to the body section by means of an expandable joint.

The expandable joint advantageously allows for thermal expansion of the electrowetting liquids.

Preferably, the electrowetting cell comprises first and second end sections secured to respective ends of the body section. The end sections are preferably located on an optical axis of the electrowetting cell.

The expandable joint preferably incorporates at least one flexible element.

The expandable joint preferably incorporates at least one flange, preferably a first flange and a second flange, one or both of which may be peripheral flanges.

The first and second flanges are preferably joined substantially at peripheral edges thereof. The first and/or second flange is preferably flexible.

Preferably the first and second flanges are made of metal. Preferably the first and second flanges are soldered to adjacent parts of the body section and the end section respectively.

Preferably the first and second end sections are joined to the body section with respective first and second expandable joints.

The presence of means for allowing expansion of fluid in the electrowetting cell is known per se from JP-A 2002/162506. This document discloses an electrowetting cell having a fluid chamber and a specific space partitioned off from the fluid chamber with film-shaped flexible members. This space is formed inside the thickness of a wall part of the body section. If the fluid pressure becomes large, the flexible member will deform, and the size of the fluid chamber is enlarged. It is observed that the flexible member does not act as a joint between one end section and the body section.

The construction of this prior art document has several disadvantages. First of all, the allowed expansion is rather small. The only element that moves, is the flexible member, and not at all the end section as a whole. As a consequence, the volume added to the fluid chamber results only from the deformation of the flexible member per se.

Secondly, the space will comprise air, and hence the counterpressure is rather limited. There is thus a risk that the flexible member will deform at low pressures, particularly in the course of time and in a non-elastic manner. Then, it will not work adequately anymore when needed to compensate for substantial temperature variations. In the construction of the invention, however, the expandable joint, and particularly the membrane, may be pre-stressed, so as to provide a threshold against deformation.

According to a second aspect of the invention a method of assembling an electrowetting cell includes securing at least one end section of the cell to a body section of the cell defining a cavity, by means of an expandable joint; and filling the cavity with electrowetting fluids.

Preferably a first end section is secured to the body section, then the electrowetting fluids are placed in the cavity and then a second end section is secured to the filled body section.

The first end section is preferably put under tension, to expand the expandable joint, during filling of the cavity.

The invention further relates to a method of manufacturing of an electrowetting cell. In order to reduce the manufacturing complexity, it would be advantageous to provide a method thereof, in which the number of individual assembly steps is reduced. The inclusion of an expandable joint appears, however, to increase the complexity, if considered in comparison with the cell disclosed in JP-A 2002/162506.

It is therefore an object of the invention to provide a manufacturing method for an electrowetting cell comprising a body section defining a cavity containing electrowetting fluids and at least one end section secured to an end of the body section with an expandable joint.

This object is therein achieved that the method comprises the steps of providing a subassembly in which the end section is secured to a contact by means of an expandable joint, and connecting the contact with the body section. The expandable joint is herein thus joining two separate parts, but is not applied in a specific joining step. Instead thereof, the joining happens between the contact adjacent to the joint and the body section. It is to be understood herein, that the term 'contact' is meant to be a mechanical contact and not necessarily an electrical contact.

The expandable joint is herein preferably ring-shaped. Herein an integrated and continuous joint is made between the end section and the body section. The ring does not need to be circular, but could have an oval or other shape. The expandable joint comprises a metal by preference. This improves the hermeticity, as metals are not open for diffusion of small molecules, such as many polymers are. Moreover, metals are not prone to dissolution in any of the electrowetting fluids. Chemical reactions are not known to take place, but may be counteracted with further protective coatings if needed. The expandable joint has preferably a structured and non-planar surface. Examples hereof are surfaces that are curved, undulating, zigzag-like in cross-sectional view and surfaces that are provided with protrusions.

Several embodiments are envisageable for the subassembly. A basic distinction can be made between two major embodiments. In the first thereof, the contact and the end section are independent parts. It will be understood that the contact is herein primarily a surface that is well connectable to the body section. The end section could have the shape of a lens, so as to provide additional functionality to the electrowetting cell. In a very suitable embodiment of the latter, the layer that constitutes the expandable joint, may even extend to a surface of said lens. Herewith an integrated attachment of both parts is achieved.

In the second embodiment the contact and the end section are formed as part of one substrate. For processing reasons, this embodiment appears preferable, as the number of different components in the subassembly is reduced. Moreover, the substrate may extend on a wafer-level and be separated into individual subassemblies later on and even after the assembly with the body section to define the electrowetting cell. A suitable substrate material is glass, but alternative materials such as semiconductor substrates are certainly not excluded. The substrate may well be provided with additional functionality.

The subassembly of the second embodiment is suitably made in a process with the steps of: (a) providing a first layer on a carrier layer; (b) deforming at least a portion of the first layer, resulting in a first layer with a deformed, non-planar surface; (c) providing a membrane layer at the non-planar surface, (d) exposing the said portion of the first layer at least partially by partial removal of the carrier layer, therewith defining and end section and a contact within the carrier layer, and (e) removing said portion of the first layer, therewith obtaining the expandable joint. The essence of this invention is that the carrier layer and the first layer are used to carry the membrane layer and for adequately defining the desired shape. Due to the sacrificial character of at least the portion of the first layer, there is a larger freedom to create the desired shape. Moreover, the first layer can be handled adequately, which is not generally the case with the membrane layer.

The choice of the first layer does not appear to be critical; the first layer is for instance a metal or a photoresist. The deformation in step (b) can be suitably be carried out with a forging tool, but also with moulding methods or with photolithographic techniques. In the case of moulding methods, the steps (a) and (b) are carried out simultaneously, so as to provide a first layer with a deformed surface.

In a first embodiment, the membrane layer is a metal. This has the advantage that a metal membrane can be manufactured with very simple techniques. Moreover, the use of metal allows the formation of a hermetically sealed package, which prevents diffusion of any fluid or other material.

In a second embodiment, the membrane layer is a cross-linked polymer layer provided in a moulding process. Particularly, it is an optically transparent layer, in which also a lens is defined. The integration of a lens and a membrane offers highly interesting opportunities, even outside the field of electrowetting cells.

The invention extends to an imaging sensor incorporating an electrowetting cell as described above. The invention extends to an image capture device or imaging sensor incorporated in a telephone, such as a mobile telephone.

All of the features described herein may be combined with any of the above aspects, in any combination.

For a better understanding of the invention, and to show how embodiments of the same may be carried into effect, reference will now be made, by way of example, to the accompanying diagrammatic drawings in which.

Figure 1:
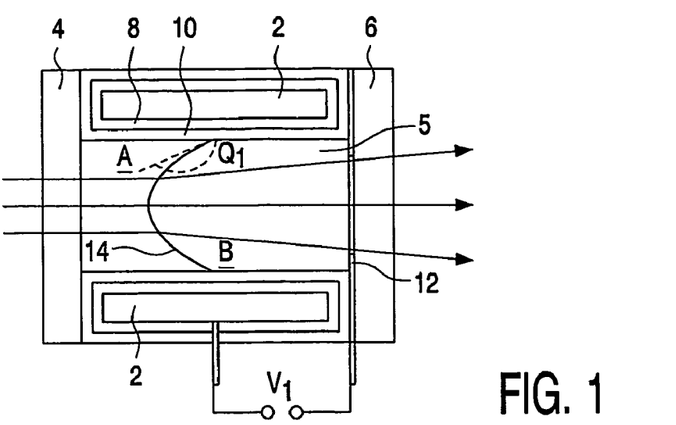
FIGS. 1 to 3 show an adjustable lens in schematic cross section from a prior publication included for background.
Figure 2:
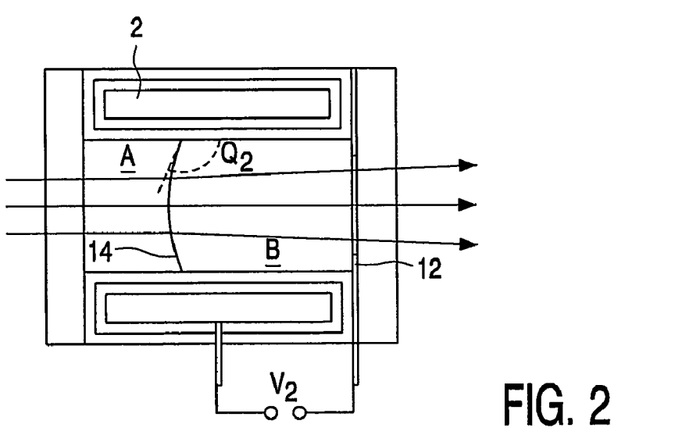
Figure 3:
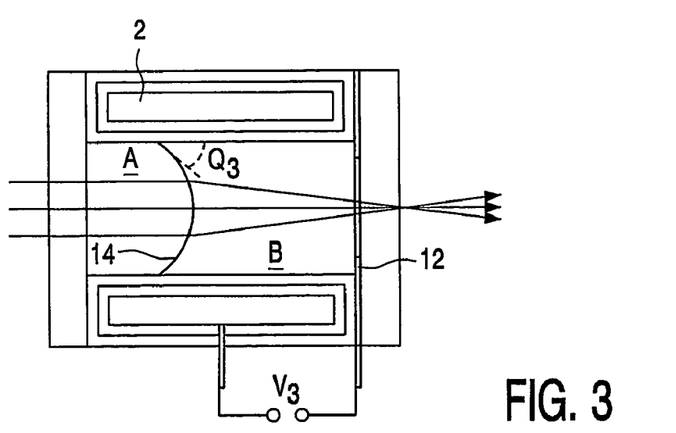

FIGS. 1 to 3 and the following description thereof are taken from WO 03/069,380 in order to provide background material and support in relation to electrowetting lenses. The figures show a variable focus lens comprising a cylindrical first electrode 2 forming a capillary tube, sealed by means of a transparent front element 4 and a transparent back element 6 to form a fluid chamber 5 containing two fluids. The electrode 2 may be a conducting coating applied on the inner wall of a tube.

In this example the two fluids consist of two non-miscible liquids in the form of an electrically insulating first liquid A, such as a silicone oil or an alkane, referred to herein further as "the oil", and an electrically conducting second liquid B, such as water containing a salt solution. The two liquids are preferably arranged to have an equal density, so that the lens functions independently of orientation, i.e. without dependence on gravitational effects between the two liquids. This may be achieved by appropriate selection of the first liquid constituent; for example alkanes or silicon oils may be modified by addition of molecular constituents to increase their density to match that of the salt solution.

Depending on the choice of the oil used, the refractive index of the oil may vary between 1.25 and 1.60. Likewise, depending on the amount of salt added, the salt solution may vary in refractive index between 1.32 and 1.50. The fluids in this embodiment are selected such that the first fluid A has a higher refractive index than the second fluid B.

The first electrode 2 is a cylinder of inner radius typically between 1 mm and 20 mm. The electrode 2 is formed from a metallic material and is coated by an insulating layer 8, formed for example of parylene. The insulating layer has a thickness of between 50 nm and 100 μm, with typical values between 1 μm and 10 μm. The insulating layer is coated with a fluid contact layer 10, which reduces the hysteresis in the contact angle of the meniscus with the cylindrical wall of the fluid chamber. The fluid contact layer is preferably formed from an amorphous fluorocarbon such as Teflon™ AF1600 produced by DuPont™. The fluid contact layer 10 has a typical thickness of between 5 nm and 50 μm. The AF 1600 coating may be produced by successive dip coating of the electrode 2, which forms a homogeneous layer of material of substantially uniform thickness since the cylindrical sides of the electrode are substantially parallel to the cylindrical electrode; dip coating is performed by dipping the electrode whilst moving the electrode in and out of the dipping solution along its axial direction. The parylene coating may be applied using chemical vapour deposition. The wettability of the fluid contact layer by the second fluid is substantially equal on both sides of the intersection of the meniscus 14 with the fluid contact layer 10 when no voltage is applied between the first and second electrodes.

A second, annular electrode 12 is arranged at one end of the fluid chamber, in this case, adjacent the back element. The second electrode 12 is arranged with at least one part in the fluid chamber such that the electrode acts on the second fluid B.

The two fluids A and B are non-miscible so as to tend to separate into two fluid bodies separated by a meniscus 14. When no voltage is applied between the first and second electrodes, the fluid contact layer has a higher wettability with respect to the first fluid A than the second fluid B. Due to electrowetting, the wettability by the second fluid B varies under the application of a voltage between the first electrode and the second electrode, which tends to change the contact angle of the meniscus at the three phase line (the line of contact between the fluid contact layer 10 and the two liquids A and B). The shape of the meniscus is thus variable in dependence on the applied voltage.

Referring now to FIG. 1, when a low voltage $V_1$, e.g. between 0 V and 20 V, is applied between the electrodes the meniscus adopts a first concave meniscus shape. In this configuration, the initial contact angle $\theta_1$ between the meniscus and the fluid contact layer 10, measured in the fluid B, is for example approximately 140°. Due to the higher refractive index of the first fluid A than the second fluid B, the lens formed by the meniscus, here called meniscus lens, has a relatively high negative power in this configuration.

To reduce the concavity of the meniscus shape, a higher magnitude of voltage is applied between the first and second electrodes. Referring now to FIG. 2, when an intermediate voltage $V_2$, e.g. between 20 V and 150 V, depending on the thickness of the insulating layer, is applied between the electrodes the meniscus adopts a second concave meniscus shape having a radius of curvature increased in comparison with the meniscus in FIG. 1. In this configuration, the intermediate contact angle $\theta_2$ between the first fluid A and the fluid contact layer 10 is for example approximately 100°. Due to the higher refractive index of the first fluid A than the second fluid B, the meniscus lens in this configuration has a relatively low negative power To produce a convex meniscus shape, a yet higher magnitude of voltage is applied between the first and second electrodes. Referring now to FIG. 3, when a relatively high voltage $V_3$, e.g. 150 V to 200 V, is applied between the electrodes the meniscus adopts a meniscus shape in which the meniscus is convex. In this configuration, the maximum contact angle $\theta_3$ between the first fluid A and the fluid contact layer 10 is for example approximately 60°. Due to the higher refractive index of the first fluid A than the second fluid B, the meniscus lens in this configuration has a positive power.

Note that, whilst achieving the configuration of FIG. 3 is possible using a relatively high power, it is preferred in a practical embodiment that a device including the lens as described is adapted to use only low and intermediate powers in the ranges described, that is to say that the voltage applied is restricted such that the electrical field strength in the insulating layer is smaller than 20 V/μm, and excessive voltages causing charging of the fluid contact layer, and hence degradation of the fluid contact layer, are not used.

Note furthermore that the initial, low voltage, configuration will vary in dependence on the selection of the liquids A and B, in dependence on their surface tensions). By selecting an oil with a higher surface tension, and/or by adding a component, such as ethylene glycol, to the salt solution which reduces its surface tension, the initial contact angle can be decreased; in this case the lens may adopt a low optical power configuration corresponding to that shown in FIG. 2, and an intermediate power configuration corresponding to that shown in FIG. 3. In any case, the low power configuration remains such that the meniscus is concave, and a relatively wide range of lens powers can be produced without using an excessive voltage.

Although the fluid A has a higher refractive index than fluid B in the above example, the fluid A may also have a lower refractive index than fluid B. For example, the fluid A may be a (per)fluorinated oil, which has a lower refractive index than water. In this case the amorphous fluoropolymer layer is preferably not used, because it might dissolve in fluorinated oils. An alternative fluid contact layer is e.g. a paraffin coating.

A solution to the problems described in the introduction is based on the possibility of soldering metal onto glass or other materials. Soldered connections are not permeable for the liquids used, and thus can offer a long lifetime for electrowetting devices.

Figure 9:
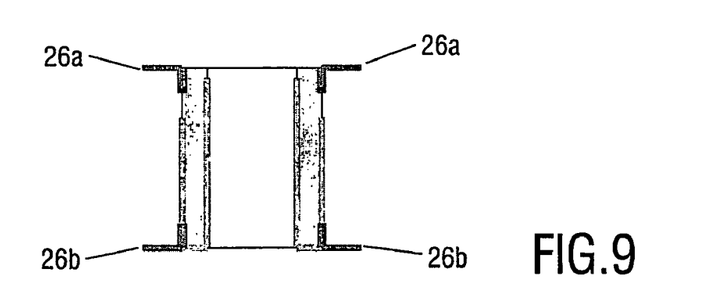
Figure 10:
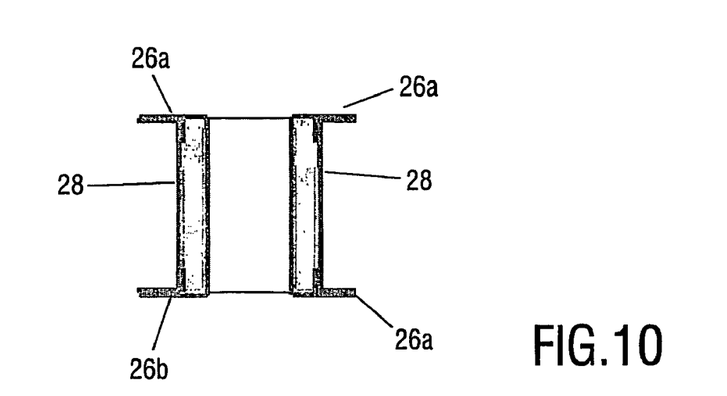
Figure 11:
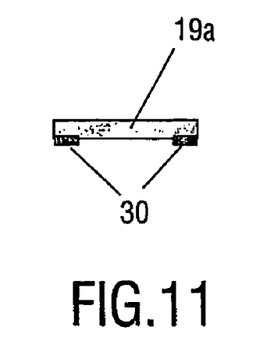
FIGS. 11 and 12 show schematic cross-sectional side views of windows of the electrowetting cell.
Figure 12:
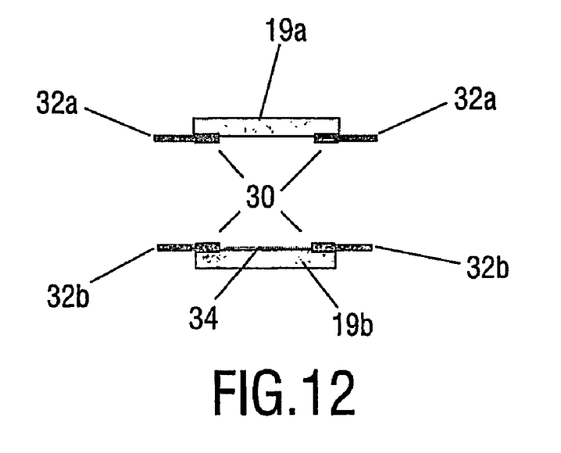
Figure 14:
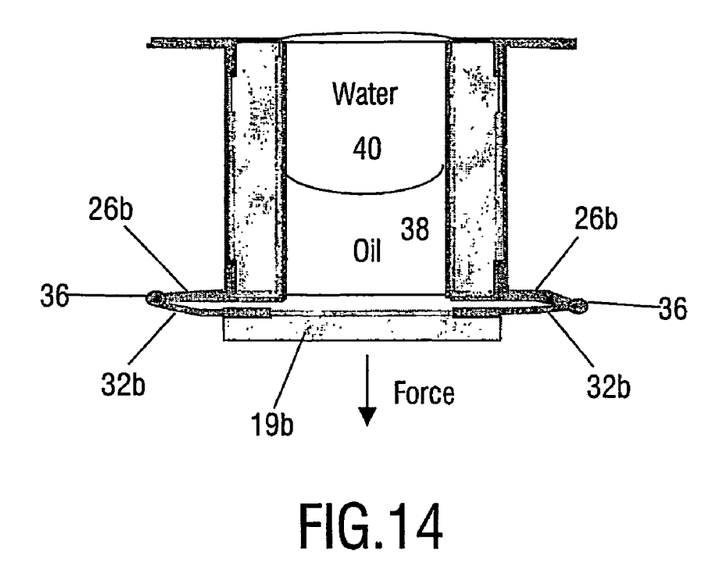
Figure 15:
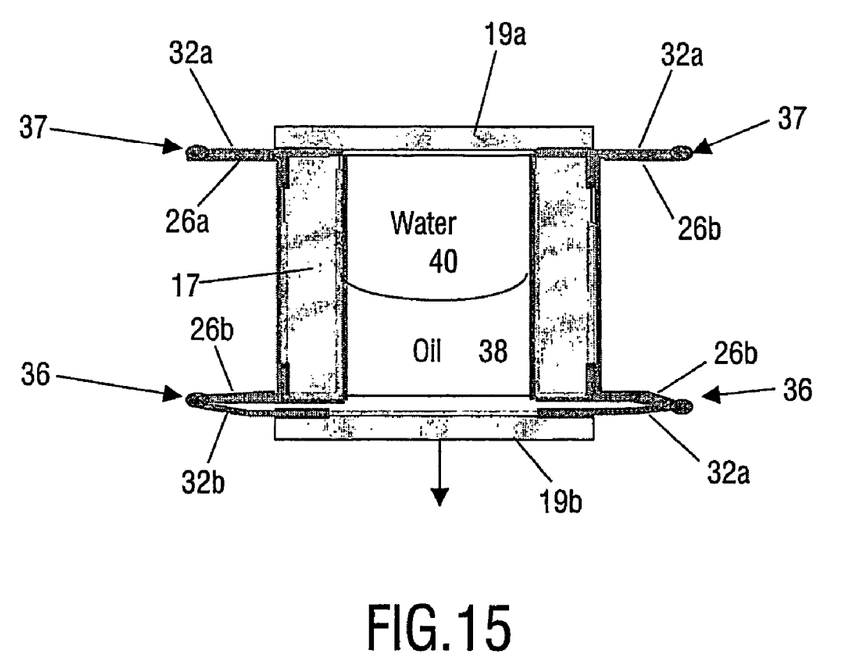
Figure 16:
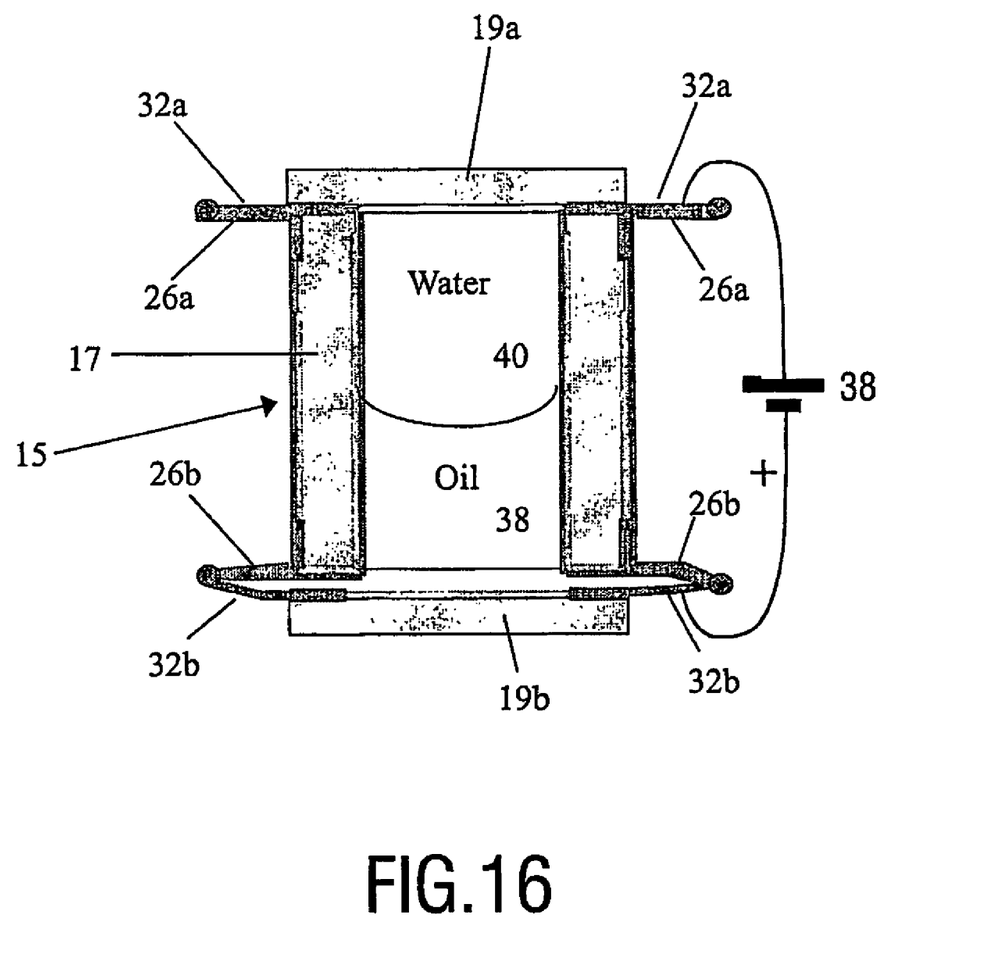

In this proposition an electrowetting cell 15 as shown fully in FIG. 16, and in various stages of construction in FIGS. 7 to 15, consists of a non-conducting tube 17 coated with Indium Tin Oxide (ITO) and having glass end windows 19a/b (see FIGS. 11 and 12). The embodiment will be described in terms of the production steps of the electrowetting cell, as follows.

Figure 7:
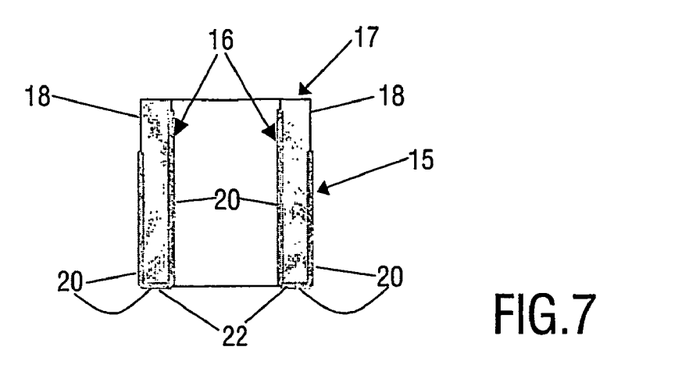
FIGS. 7 to 10 show schematic cross-sectional side views of an electrowetting cell during stages of construction.

A non-conducting tube 17 is coated partially with ITO 20, see FIG. 7.

Inner walls 16 of the tube 17 are coated from the bottom up to just short of the top thereof. Outer walls 18 are coated from the bottom to a point lower than the coating on the inner walls. A bottom end 22 of the tube is also coated with ITO.

Figure 8:
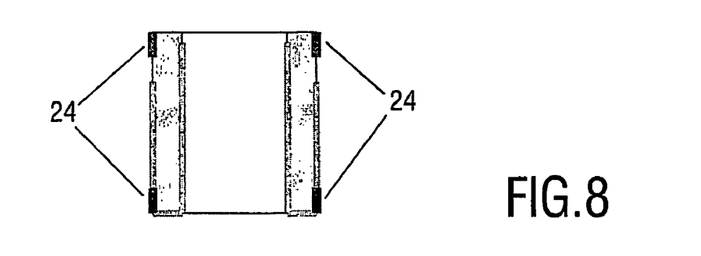

In FIG. 8, a solderable coating 24 is applied to the tube at outer top and bottom edges. Given the shape of the tube the coating is in top and bottom rings. The solderable coating may be a nickel palladium gold coat.

In FIG. 9, ring-shaped metal flanges or membranes 26a and b are soldered to the solderable coating 24 of the tube at top and bottom ends thereof. The membranes 26a/b extend away from the tube 17, and form flanges that extend generally horizontally.

In FIG. 10, parylene insulator coating 28 and hydrophobic coating (such as a fluoride compound) is applied to all outer surfaces of the tube 17.

In FIG. 11, a solderable coating 30 is applied in a ring to an outer edge of inner faces of the end windows 19a/b. Only the upper window 19a is shown in FIG. 11.

In FIG. 12, ring-shaped metal flanges or membranes 32a/b are then soldered to the solderable coating 30 on the upper and lower end windows 19a/b respectively. The lower window 19b is coated with a hydrophobic coating 34.

Figure 13:
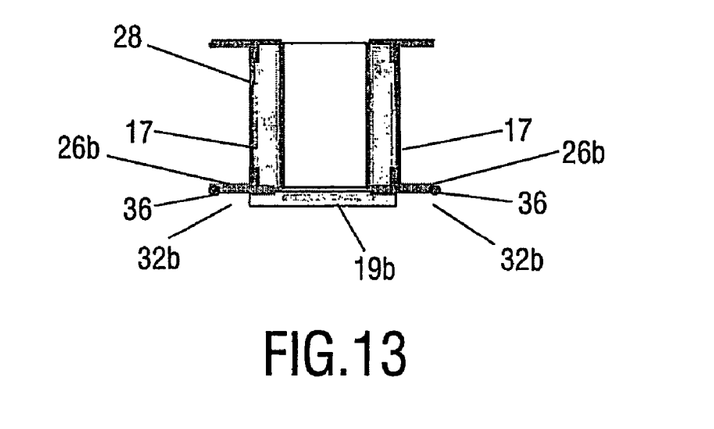
FIGS. 13 to 16 show schematic cross-sectional side views of later stages in the construction of an electrowetting cell.

In FIG. 13 the outer edge 36 of the metal membrane 32b of the hydrophobic coated lower window 19b is joined with the corresponding outer edge of the metal membrane 26b of the tube 17 for example by welding, soldering or ultrasonic welding. The joined outer edges are clear of the insulator coating 28 and so an electrically conducting connection is made between the membrane 26b and the membrane 32b.

Now, at FIG. 14, the cell 15 can be filled with the electrowetting fluids. First a non-conducting liquid 38 (such as oil), then a conducting liquid 40, such as water. While filling, the lower window 19b is put under tension, i.e. pulled downwards. The join between the lower window 19b and the tube 17 is only at the outer edges of the membranes 26b and 32b. Consequently, the membranes 26b and 32b form a hinge that allows the lower window 19b to move away from the tube 17 and so increase the volume within the tube 17.

At FIG. 15, the upper window 19a is put on the assembly in such a way that all vapour escapes from the lens, i.e. the water 40 bulges out of the top of the tube 17 due to surface tension, thus leaving no air gap before the upper window 19a is put in place. The two metal flanges 32a and 26a can now be joined at joint 37, in the same way as the lower window 19b is joined to the tube 17.

The force on the lower window 19b can then be released, causing the fluids to be compressed.

In FIG. 16, the metal membranes 32a and 32b are used as electrical contacts for the cell, which has a power supply 38 contacting the membranes 32a and 32b respectively.

This electrowetting cell assembly has all the desired features as follows.

All joints are achieved without glue so no liquid can escape from the assembly, resulting in an extended lifetime.

Because the lower window 19b is put under tension while filling, there is an excess of liquid 38/40, that is under a little tension. At low temperatures the liquids 38/40 contract, and the excess of liquid 38/40 held by the cavity opened by the bulging lower window 19b can flow in the tube 17 to avoid the creation of vapour.

At high temperatures the joints 36, 37 on the metal membranes 26a/32a and 26b/32b have enough flexibility to absorb the expansion of the liquids 38/40.

The metal membranes 32a/b also act as electrical contact points for the electrowetting cell.

The lens is used in the usual way by focusing a beam passed into one of the windows 19a/b through the liquid 38/40 to be refracted and then out of the other window 19a/b.

Figure 17:
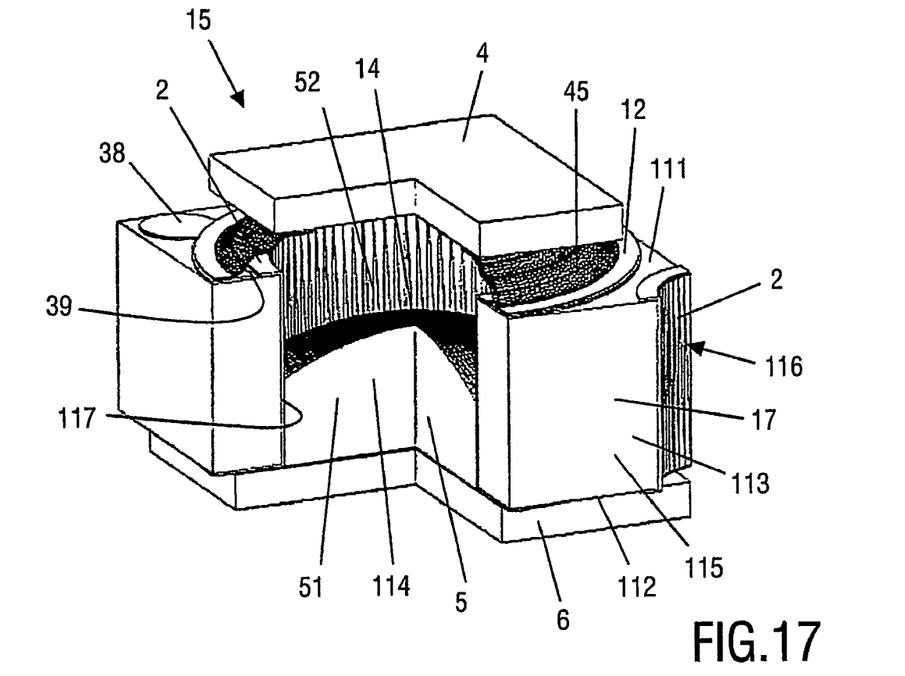
FIG. 17 shows a schematic bird's eye view of a second embodiment of the invention.
Figure 18:
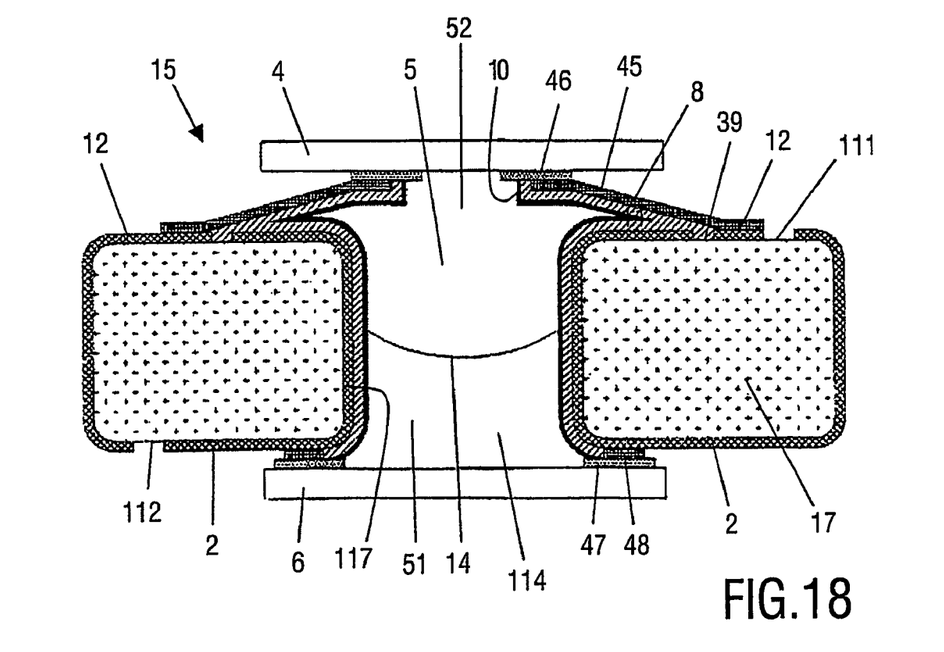
FIG. 18 shows a schematic cross-sectional view of the second embodiment.

FIGS. 17 and 18 show an electrowetting cell 15 according to a second embodiment of the present invention. In FIG. 1, for the sake of clarity, a quarter of the cell, in this case a lens 15 is broken away. For sake of clarity like numbers as in FIG. 1 to 3 are used for similar or equal parts. The lens includes fluid chamber 5, with a first fluid 51 and a second fluid 52 that are non-miscible and contact each other over a meniscus 14. The first fluid 51 is in this example a silicone oil, an alkane or another suitable electrically insulating fluid. The second fluid 52 is in this example water containing a salt solution or another suitable electrically conducting fluid. The sides of the chamber are provided with an electrically insulating layer 8 and a fluid contact layer 10, for instance parylene.

The electrically insulating member or non-conducting tube 17 has a first end surface 111, an opposite second end surface 112 and a circumferential surface 113 extending between the first end surface 111 and the second end surface 112. The electrically insulating member 17 is provided with a through-hole 114 extending between the first end surface 111 and the second end surface 112. In the shown example, the through-hole 114 is shaped as a cylinder having a circular transverse section. Further, in the shown example, the circumferential surface 113 comprises four rectangular flat surfaces 115 and two concave surfaces 116, wherein each concave surface 116 extends between two flat surfaces 115. In FIG. 17, only one concave surface 116 is shown, as the other concave surface 116 is part of the quarter that is broken away.

The lens 1 comprises a first electrode 2 and a second electrode 12, which are both applied to the surface of the electrically insulating member 17 as a layer comprising an electrically conducting material, for example gold plated copper.

The first electrode 2 covers a part of the first end surface 111, an inner surface 117 of the electrically insulating member 17 defining the through-hole 114, a part of the second end surface 112, and one concave surface 116. The portion of the first electrode 2 arranged on the first end surface 111 is shaped as a ring encompassing a first end of the through-hole 114. The second electrode 12 covers a part of the first end surface 111, and one of the concave surfaces 116, i.e. the concave surface 116 which is not covered by the first electrode 2. It is connected to interconnect 38. It will be understood that the first electrode 2 and the second electrode 12 do not contact each other on the electrically insulating member 17. Consequently, on the first end surface 111, the second electrode 12 encompasses the first electrode 2 at a distance, so that a part 39 of the first end surface 111 shaped as a ring is left uncovered.

The second end of the through-hole 114 is covered by an optically transparent second cover plate 6. In the shown example, the second cover plate 6 has a rectangular shape, wherein the dimensions of the second cover plate 6 are such that it is capable of covering the second end surface 112 completely. The second cover plate 6 may for example comprise glass.

At the side of the first end surface 111, the lens 15 comprises an optically transparent first cover plate 4 and a spacer 45, wherein a top portion of the spacer 45 is attached to the first cover plate 4, and wherein a bottom portion of the spacer 45 is attached to the second electrode 12. According to the invention, the first cover plate 4 acts as the end section and the spacer 45 acts as the expandable joint, and is particularly a membrane.

In the shown example, the spacer 45 comprises a flexible foil having a three-dimensional structure or a stepped structure which contributes to the flexibility of the spacer. As a result of the stepped structure, it may deform for volume expansion. Such a flexible foil is suitable made in that the foil is provided as a thin layer on a carrier layer. This carrier layer was deformed in advance so as to contain the three-dimensional or stepped structure or undulating surface. After that the foil is connected to the cover plate 4 or member 17, at least part of the carrier layer is removed, so that the foil with the membrane function is left over. The deformation of the carrier layer is suitable carried out with a forging tool, while the carrier layer is attached to a temporary substrate. The thin layer is for instance of nickel, the carrier layer of copper and the temporary substrate of aluminium. The carrier layer of copper is herein removed only partially.

Preferably, the foil comprises an electrically conducting material, and the connection between the spacer 45 and the second electrode 12 is realized by means of solder, so that the second electrode 12 is functionally elongated by means of the spacer 45. However, it is also possible that the foil comprises another material, and that alternatives such as glue or the like are used for the purpose of connecting the spacer 45 to the second electrode 12.

Further, in the shown example, the first cover plate 4 has a rectangular shape, wherein the dimensions of the first cover plate 4 are such that an open top end of the spacer 45 is completely sealed. Like the second cover plate 6, the first cover plate 4 may for example comprise glass.

Preferably, the first cover plate 4 and the second cover plate 6 are attached to the top portion of the spacer 45 and the portion of the first electrode 2 arranged on the second end surface 112, respectively, by means of soldering. For that purpose, the first cover plate 4 may for example comprise a metal ring, which serves as a connection means between the first cover plate 4 and the spacer 45. The second cover plate 6 may also comprise a metal ring, which serves as a connection means between the second cover plate 6 and the first electrode 2. In FIG. 2, a cross section is shown of two annular portions of solder 46, 47, wherein a first portion of solder 46 is present between the first cover plate 4 and the spacer 45, and wherein a second portion of solder 47 is present between the second cover plate 6 and the first electrode 2. Further, in FIG. 2, a cross section is shown of a solder ring 48, which is present between the second portion of solder 47 and the first electrode 2.

Advantageously, at least one of the cover plates 4,6 of the lens 15 is shaped as a lens, i.e. at least one of the cover plates 4,6 comprises a convex or a concave surface. In that way, a default focus of the lens 15 is obtained.

Figure 19:
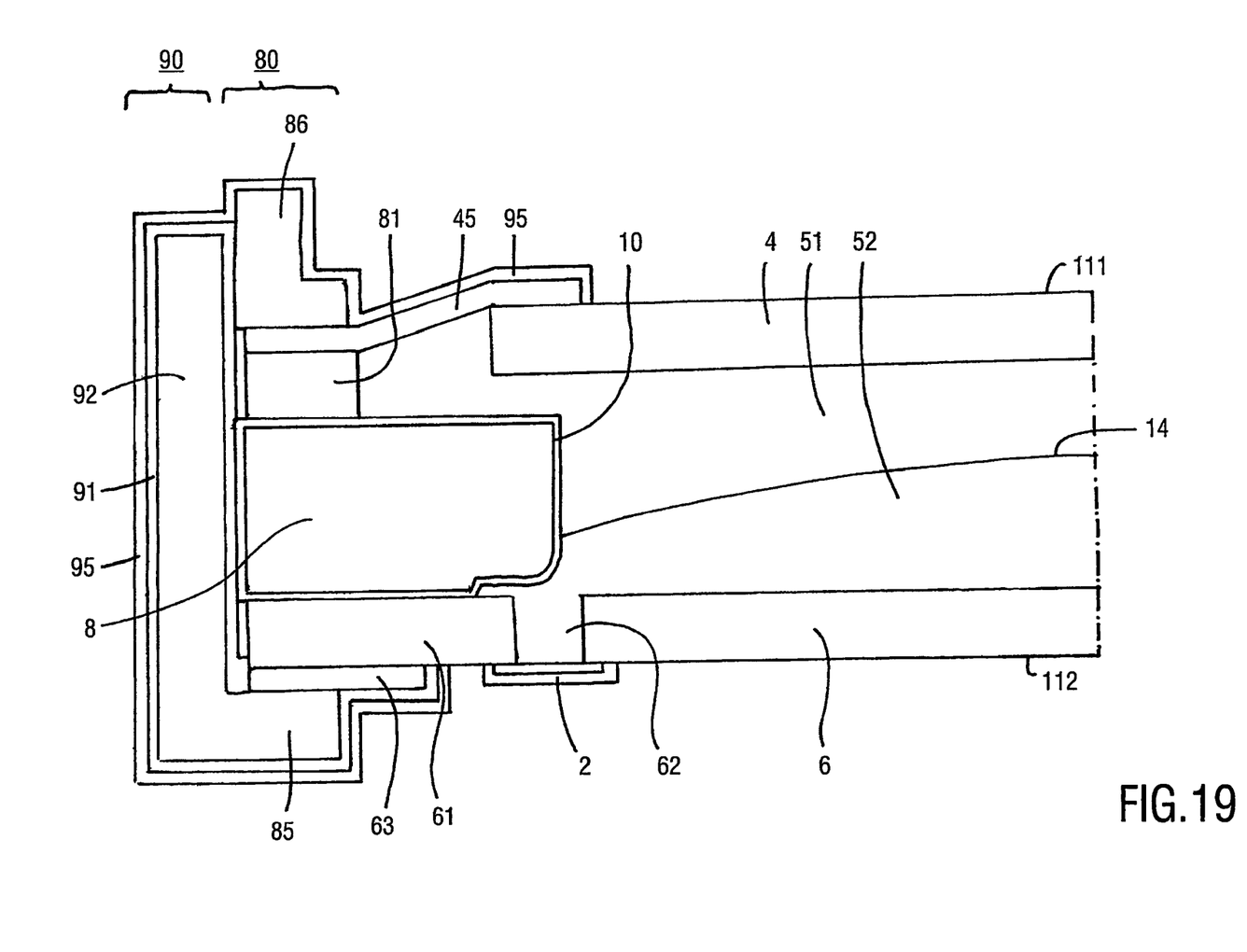
FIG. 19 shows a schematic cross-sectional view of a third embodiment, in which only a left part of the cell is shown.

FIG. 19 shows a third embodiment of an electrowetting cell 15 according to the invention. In this FIG. 19 only a partial cross-sectional view is shown, i.e. only the left part of the cell 15. The cell 15 is however built up symmetrically, such that the non-shown right part is the mirror of the left part.

According to this embodiment, the body section 17 comprises an inner wall 80 and an outer wall 90, and—at the second side 112 of the cell 15—the second cover plate 6.

The inner wall 80 comprises an electrically insulating member 8 that is coated with a fluid contact layer 10. The inner wall 80 also comprises a ring-shaped glass member 81 that is through the expandable joint 45 connected to the end section 4, i.e. the first cover plate. In a preferred embodiment, this ring-shaped glass member 81 and the end section 4 are manufactured from a single glass plate, as will be explained with reference to FIG. 20 to 25.

The inner wall 80 further comprises the end 61 of the second cover plate 6. This second cover plate 6 is provided with a through hole 62, an electrode 2, and a metallisation 63. In an alternative embodiment, the plate 6 may be replaced by a construction similar or identical to that at the first side 111 of the cell 15, i.e. a ring-shaped glass member, an expandable joint and a cover plate.

These three sections of the inner wall 80—the ring-shaped glass member 81, the—also ring-shaped—insulating member 8 and the end 61—are clamped between a protrusion 85 of the outer wall 90 and a ring-shaped closing member 86. The closing member 86 is herein a piece of metal, but can be anything with an electrically conducting surface. The outer wall 90 comprises an inner core of plastic or other material 92 that is provided with a metallized surface 91. This metallized surface 91 also circumferes the metallization 63 of the second cover plate 6. In this manner, a mechanically stable connection is provided.

The inner wall 80 and the outer wall 90 are attached to each other, as well as to the joint 45 and the end section 4, in that a sealing layer 95 is present around it. The sealing layer 95 can be made of a suitable material. Polymeric coating of rubber, epoxy or the like, as are known per se as protective coating may be used. It is however preferred that the sealing layer 95 comprises a metal. This allows the provision of a package that is hermetical and not prone to diffusion of air, water or fluid. A particularly preferred method for the provision of this metal sealing layer 95 is electroplating. This method can be carried out at three-dimensional surfaces, e.g. in a bath.

Figure 20:
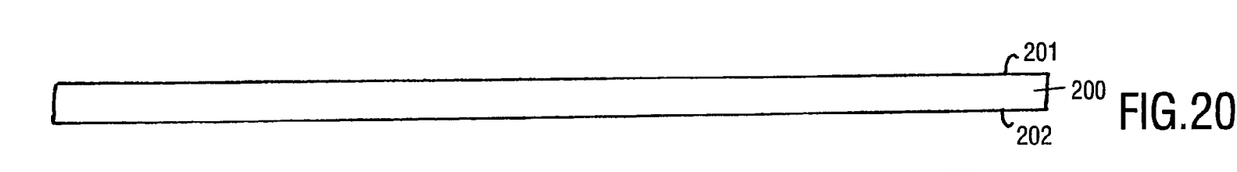
FIGS. 20 to 25 show schematic cross-sectional side views of stages in the manufacturing of a substrate with an integrated membrane.

FIG. 20 to 25 show in schematic cross-sectional views consecutive steps in a method of manufacturing of the substrate 200 with an integrated membrane 210, to be applied as expandable joint 46. FIG. 20 shows the substrate 200, with a first surface 201 and an opposed second surface 202. The substrate 200 is in this example a glass plate with a suitable thickness, for instance in the order of 0.1 mm.

Figure 21:
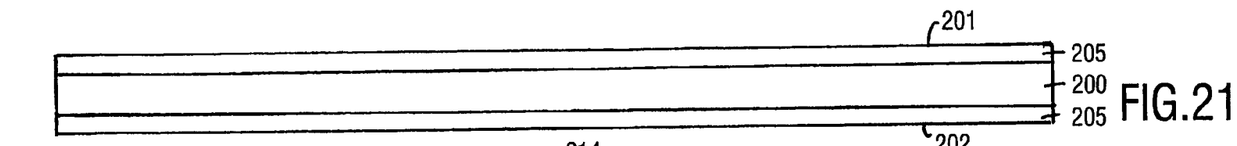

FIG. 21 shows the substrate 200, after that a photoresist 205 is applied at both surfaces 201, 202. Photoresist materials are known per se in the art.

Figure 22:
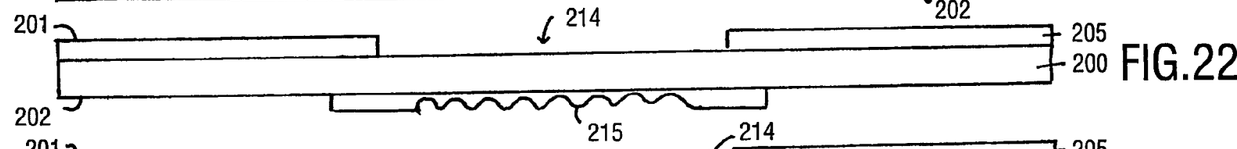

FIG. 22 shows the substrate 200 after patterning and developing the photoresist 205. The patterning at the first side 201 results in an aperture 214. The patterning at the second side 202 has resulted therein, that also the surface 215 of the photoresist 205 is given a three-dimensional structure. This surface 215 is in this example in the form of an undulating surface. This surface structure can be provided with forging or another manner of mechanical deformation. Alternatively, use is made of advanced photolithographical techniques. In an even further embodiment, use is made of a moulding technique to provide the photoresist layer 205 in the desired shape. As will be understood, no specific photoresist material is needed in such a case.

Figure 23:
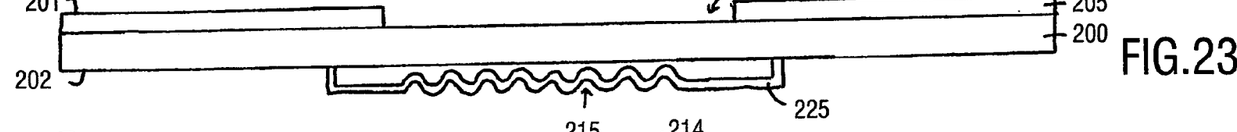

FIG. 23 shows the substrate 200 after that a membrane layer 225 is applied. The membrane layer comprises for instance a metal with some elasticity, although any other material is suitable, as long as it is compatible with the photoresist layer 205. Many metals turn out to have sufficient flexibility if applied as a thin layer. Examples include gold, copper, nickel, aluminium, as well as suitable alloys thereof. A metal layer may be applied with a suitable deposition technique, such as sputtering, chemical vapour deposition and also wet-chemical techniques. In this example, the membrane layer 225 is shown to be patterned, but that is not necessary.

Figure 24:
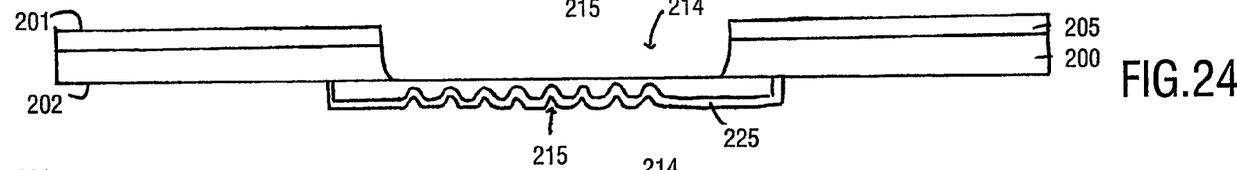

FIG. 24 shows the substrate 200 after that it has been patterned through the patterned photoresist 205 at the first side 201. In the case of a glass plate 200 the technique of power blasting can be applied advantageously, which however does not exclude any other technique such as etching.

Figure 25:
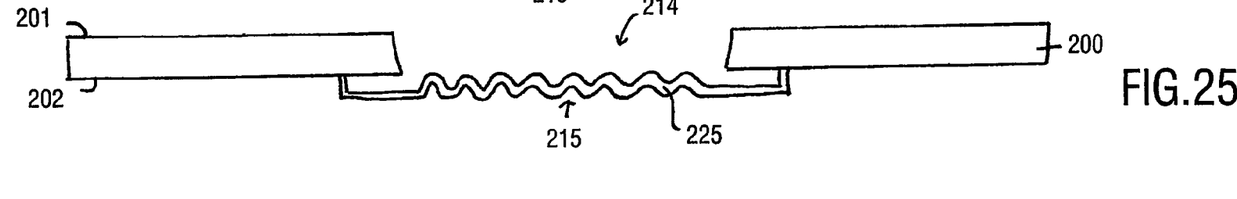

FIG. 25 shows the substrate 200 after that the photoresist 205 is removed, and a substrate 200 with an integrated membrane 225 results. As will be clear, the substrate 200 may extend in lateral directions. The membrane 225 may have any suitable shape. Particularly preferred is a ring-shape. The substrate may contain a plurality of membranes, and be suitable for wafer-level processing in a further step, or be separated. Such a separation step could also be applied before the removal of the photoresist 205. Although not shown here, it is not excluded that the substrate comprises further layers at its first or second side 201, 202. If a semiconductor substrate is used as the substrate 200, semiconductor elements such as diodes and transistors or trench capacitors may be defined herein. In short, the present invention provides an electrowetting cell including an expandable joint between a body section and an end section. Such an expandable joint could include a membrane or a flange-like portion.

This invention is especially suitable for electrowetting lenses that are to be used in imaging sensors for mobile applications including mobile telephones. In these applications a wide operating and storage temperature range is required. The present disclosure can include an image sensor and an interconnecting body, where the interconnecting body comprises electrically conductive tracks arranged on a first surface and a second surface of the interconnecting body. The electrically conductive tracks can be shaped such as to be able to establish a connection between both the image sensor and the variable focus lens or the lens assembly to driver electronics therefor, or to contact pads.

The invention claimed is:

1. An electrowetting cell comprising:
    a body section defining a cavity containing electrowetting fluids, said body section including upper and lower body section flexible membranes joined at respective top and bottom ends of the body section, wherein said body section flexible membranes form flanges that extend generally horizontally,
    upper and lower end sections including respective upper and lower end section flexible membranes joined at respective peripheral edges of said upper and lower end sections forming wherein said end section flexible membranes form flanges that extend generally horizontally,
    wherein an outer edge of the upper body section flexible membrane is joined with a corresponding outer edge of the upper end section flexible membrane to form a first flexible joint and an outer edge of the lower body section flexible membrane is joined with a corresponding outer edge of the lower end section flexible membrane to form a second flexible joint,
    wherein said first and second flexible joints allow the upper and lower end sections to flexibly move away from the body section.

2. The electrowetting cell as claimed in claim 1, in which the expandable joint incorporates at least one flexible element.

3. The electrowetting cell as claimed in claim 2, in which the flexible element is a membrane.

4. The electrowetting cell as claimed in claim 3, wherein the membrane is a thin layer that is made non-flat.

5. The electrowetting cell as claimed in claim 3, wherein the membrane is non-transparent and acts as an optical stop.

6. The electrowetting cell as claimed in claim 1, wherein the cavity defines with the end section and the expandable joint a fluid chamber having at least one side wall, that
    includes as electrowetting fluids a first and a second fluid that are non-miscible, that are in contact over a meniscus and that have different indices of refraction, and
    is provided with a first and a second electrode and with a fluid contact layer arranged on the at least one side wall, which contact layer has a wettability by the second fluid which varies under the application of a voltage between the first electrode and the second electrode, such that the shape of the meniscus varies in dependence on the said voltage.

7. The electrowetting cell as claimed in claim 1, wherein the body section comprises at least one non-fluid lens that is present at a location opposite of the fluid chamber.

8. The electrowetting cell as claimed in claim 1, which comprises first and second end sections secured to respective ends of the body section.

9. The electrowetting cell as claimed in claim 1, in which the at least one end section is located on an optical axis of the electrowetting cell.

10. The electrowetting cell as claimed in claim 1, wherein the end section is provided with a non-fluid lens.

11. An image capture device or an image sensor incorporating an electrowetting cell as claimed in claim 1.

12. An optical scanning device comprising an electrowetting cell as claimed in claim 1.

13. A display device incorporating an electrowetting cell as claimed in claim 1.

14. A method of assembling an electrowetting cell including the steps of:
    securing at least one end section of the cell to a body section of the cell defining a cavity by means of an expandable joint, and
    filling the cavity with electrowetting fluids
    wherein the expandable joint comprises a flexible metal layer and the contact is attached to the body section by metal plating a sealing layer extending on the body section and the expandable joint.

15. The method as claimed in claim 14, in which a first end section is put under tension, to expand the expandable joint, during filling of the cavity.

16. A method of manufacturing an electrowetting cell comprising a body section defining a cavity containing electrowetting fluids and at least one end section secured to an end of the body section, comprising the steps of:
    providing a subassembly in which the end section is secured to a contact by means of an expandable joint, and
    connecting the contact with the body section
    wherein the expandable joint comprises a flexible metal layer and the contact is attached to the body section by metal plating a sealing layer extending on the body section and the expandable joint.

17. The method of manufacturing a subassembly, which method comprises the steps of:
    providing a first layer on a carrier layer;
    deforming at least a portion of the first layer, resulting in a first layer with a deformed, non-planar surface;
    providing a membrane layer at the non-planar surface,
    exposing the said portion of the first layer at least partially by partial removal of the carrier layer, therewith defining and end section and a contact within the carrier layer,
    removing said portion of the first layer, therewith obtaining the expandable joint
    providing a part at the first layer adjacent to the portion with the non-planar surface, and
    providing the membrane layer in an electroplating process such that the membrane layer extends on a surface of said assembled part.

18. An electrowetting cell comprising:
    a body section defining a cavity containing electrowetting fluids, said body section including at least one flexible membrane joined at one end of the body section, wherein said at least one flexible membrane forms a flange that extends generally perpendicular to an optical axis, an end section including an end section flexible membrane joined at a peripheral edge of the end section to form a flange that extends generally perpendicular to the optical axis, wherein an outer edge of the body section flexible membrane is joined with a corresponding outer edge of the end section flexible membrane to form an expandable joint allowing the end section to flexibly move away from the body section.

* * * * *